UNITED STATES PATENT OFFICE.

BERNARD F. ERDAHL, OF DULUTH, MINNESOTA.

PROCESS OF RENDERING CONCRETE RESISTANT TO WATERS CHARGED WITH SOLUBLE COMPOUNDS AND PRODUCT THEREOF.

1,415,324.     Specification of Letters Patent.     Patented May 9, 1922.

No Drawing.     Application filed September 30, 1920. Serial No. 413,931.

*To all whom it may concern:*

Be it known that I, BERNARD F. ERDAHL, a citizen of the United States, residing at Duluth, in the county of St. Louis and State of Minnesota, have invented certain new and useful Improvements in Processes for Rendering Concrete Resistant to Waters Charged with Soluble Compounds and Product Thereof, of which the following is a specification.

My invention relates to a process for making concrete resistant to water charged with detrimental soluble salts, for example alkali and magnesium sulfates.

As a rule concrete is deposited in a half fluid consistency with a fair amount of excess water present. During the set and hardening processes this surplus water is evaporated while the crystallization of the main compounds in the cement takes place. The crystallization in itself is apt to leave open crevices between the conglomerates after the crystals have taken up all the water necessary for their formation. These crevices will then from the start, be filled with the excess water. As this water evaporates, air will take its place resulting in porosity. This porosity will then, when the concrete again is immersed in water, by capillary action cause the crevices to be filled.

When water has been percolating the soil for any length of time it is more or less impure having dissolved more or less of organic and inorganic salts that exist in the soil. The soils are very different in this respect, some of them carrying a small amount of soluble salts, others a comparatively heavy charge of them. Thus, the nature of the soil determines the nature of the water that percolates it. Soils heavily charged with alkali and magnesium sulfates have proved themselves to furnish a drainage water extremely detrimental to concrete.

Chemical reactions will take place between the cement and the sulfates carrying water, also between the aggregate and the water provided the aggregate contains lime. These reactions will ultimately bring about disintegration of the concrete.

It is the object of this invention to prevent the disintegration of concrete by applying to the walls of the concrete-capillaries a colloidal metal-alginate-gel.

The colloidal metal-alginate-gel is prepared by treating an algin base, preferably sodium alginate, with a metal compound, preferably a chloride, eliminating the excess of chlorides from the reaction-product, and thereafter treating with a substance capable of transforming the purified reaction-product into a colloidal metal-alginate-gel, all the reaction being effected in the cold. For the latter purpose ammonia may be used, resulting in the formation of a colloidal ammonio-metal-alginate-gel. The chloride used may be those of iron, aluminum or copper, of course resulting in the production of the corresponding colloidal ammonio-iron, aluminum or copper-alginate-gel. The production of colloidal metal-alginate-gels is described and claimed in my copending application Serial No. 413932, filed September 30, 1920.

The colloidal ammonio-alginate-gels of the metals, especially iron, aluminum and copper are miscible with water and a certain amount, depending on the character of the concrete, is added to the concrete, preferably to the mixing water. Upon drying of the concrete, an insoluble film will be left on the walls of the capillaries.

The film formed has the following qualities:

(1) A fair tensile strength (cohesiveness),
(2) Capable of adhering to the walls of the capillaries,
(3) Insoluble in waters charged with soluble substances, mainly alkali compounds,
(4) Adapted to form a continuous or non-porous coating, and
(5) Not interfering in any marked degree with the strength of the concrete.

It is because the film possesses the above enumerated qualities that it admirably prevents the disintegration of concrete by the solvent action of the alkali waters. The application of a gel, particularly a metal alginate-gel, to the concrete-capillaries gives a film which is capable of adhering to the capillary-walls, cohesive, continuous, and at the same time, insoluble in alkali-waters. Metal alginates, as ordinarily prepared, are not suitable for making concrete resistant to alkali-waters since they are not in the condition of a gel.

After numerous experiments, it has been found that alginate-gels may be prepared as above described and more particularly set forth in my copending application Serial No. 413,932, filed September 30, 1920. It is only by eliminating the impurities from the reaction-product formed by treating an algin base with a metal compound and thereafter treating with a gelling agent, preferably ammonia, being careful to perform all reactions in the cold at a temperature of approximately 32 to 50° F., that a gel can be formed. Due to the gel-condition of the metal alginate it has properties entirely different from the ordinary alginate; namely, it is cohesive, capable of adhering well to the concrete capillaries and is resistant to, that is, insoluble in alkali charged waters. The elimination of the impurities during the preparation of the gell is, in a large measure, responsible for the latter quality. Soluble impurities, usually alkali compounds, are present in metal alginates as ordinarily prepared and are due to the reaction substances employed in their preparation. The presence of such impurities renders the alginates utterly useless for making concrete resistant to alkali-waters.

Alginates, as ordinarily prepared, do not possess a true filming quality. Alginates prepared by treating an algin-base such as sodium alginate with iron, aluminum or copper chlorids, or the products resulting from the treatment of sodium alginates with an acid, do form a jelly but this is not a colloidal gel in the sense in which the term is understood by those skilled in the art. The jelly referred to is very coarse grained, non-adhesive, and lacks cohesiveness, crumbling on drying to a fine powder. Such a product is obviously incapable of making concrete resistant to alkali-waters. It is only when a colloidal gel is used that a true film possessing the properties enumerated is formed in the capillaries of the concrete.

Faulty preparation of the colloidal ammonio-metal-alginate-gel will show its effect in the dried film not being absolutely continuous or non-porous. To offset any defect in the preparation and to serve as an additive measure further fortifying the impermeability of the film, a suitable amount of a wax, for example bees-wax, is dissolved in an adequate amount of an alcohol of the $C_nH_{2n+2}O_2$ series, preferably glycerin. The resultant solution treated with ammonia forms a water-soluble or miscible emulsion. Upon the addition to concrete of the gelling ammonio-metal-alginates, carrying incorporated therein the fortifying agent, the water solution of calcium hydroxid present in the concrete reacts with the fortifying agent to form an insoluble calcium soap, thus closing the eventual pores in the alginate film and making it impermeable. The production of fortified colloidal metal-alginate-gels are described and claimed in my copending application Serial No. 413,932, filed September 30, 1920.

I claim:

1. The process of making concrete resistant to water charged with soluble compounds, comprising adding to the concrete a colloidal alginate-gel.

2. The process of making concrete resistant to water charged with soluble compounds, comprising adding to the concrete a colloidal metal-alginate-gel.

3. The process of making concrete resistant to water charged with soluble compounds, comprising adding to the concrete a colloidal ammonio-metal-alginate-gel.

4. The process of making concrete resistant to water charged with soluble compounds, comprising treating the concrete with a colloidal-alginate-gel carrying a fortifying agent adapted to react with the concrete to form a metallic soap.

5. The process of making concrete resistant to water charged with soluble compounds, comprising treating the concrete with a colloidal ammonio-metal-alginate-gel carrying a fortifying agent adapted to react with the concrete to form a metallic soap.

6. The process of making concrete resistant to water charged with soluble compounds, comprising adding to the concrete a colloidal-alginate-gel and an emulsion of wax dissolved in an alcohol of the $C_nH_{2n+2}O_2$ series, adapted to react with the compounds present in the concrete to form a metallic soap, and thereby fortify the impermeability of the dried alginate-gel.

7. The process of making concrete resistant to water charged with soluble compounds, comprising adding to the concrete a colloidal ammonio-metal-alginate-gel and an ammonia emulsion of wax dissolved in glycerin, adapted to react with compounds present in the concrete, to form a metallic soap, and thereby fortify the impermeability of the dried alginate-gel.

8. As a new product, concrete having the capillaries thereof coated with a non-porous insoluble alginate-film.

9. As a new product, concrete having the capillaries thereof coated with an alginate-film.

10. As a new product, concrete having the capillaries thereof coated with a metal-alginate-film.

11. As a new product, concrete having the capillaries thereof coated with an ammonio-metal-alginate-film.

12. As a new product, concrete having the capillaries thereof coated with a non-porous insoluble film resulting from the treatment with a gelling ammonio-metal-alginate.

13. As a new product, concrete having the capillaries thereof coated with a non-porous insoluble film comprising an alginate mixed with a metallic soap.

14. As a new product, concrete having the capillaries thereof coated with a non-porous insoluble film comprising an alginate and a fortifying agent.

15. As a new product, concrete having the capillaries thereof coated with a non-porous insoluble film comprising a metal alginate resulting from the treatment with an ammonio-metal-alginate, and a calcium soap.

16. As a new product, concrete having the capillaries thereof coated with a non-porous, insoluble metal-alginate-film fortified with an incorporated insoluble and impermeable calcium soap formed by the reaction of the calcium hydrate present in wet concrete on the addition of an ammonia emulsion of a wax dissolved in glycerine.

17. As a new product, concrete having the capillaries thereof coated with a gelled alginate-film.

18. As a new product, concrete having the capillaries thereof coated with a gelled metal-alginate-film.

19. As a new product, concrete having the capillaries thereof coated with a gelled ammonio-metal-alginate-film.

20. As a new product, concrete having the capillaries thereof coated with a non-porous insoluble film comprising a gelled alginate mixed with a metallic soap.

21. As a new product, concrete having the capillaries thereof coated with a non-porous insoluble film comprising a gelled alginate and a fortifying agent.

22. As a new product, concrete having the capillaries thereof coated with a non-porous insoluble film resulting from treatment with an alginate reaction-product formed by gelling a purified metal alginate in the cold.

23. As a new product, concrete having the capillaries thereof coated with a non-porous insoluble film resulting from treatment with an alginate reaction-product formed by gelling a purified metal alginate with ammonia in the cold.

In testimony whereof I affix my signature.

BERNARD F. ERDAHL.

Certificate of Correction.

It is hereby certified that in Letters Patent No. 1,415,324, granted May 9, 1922, upon the application of Bernard F. Erdahl, of Duluth, Minnesota, for an improvement in "Processes of Rendering Concrete Resistant to Waters Charged with Soluble Compounds and Product Thereof," an error appears in the printed specification requiring correction as follows: Page 3, after line 52 insert the following paragraph, intended as a claim:

*As a new product, concrete having the capillaries thereof coated with a non-porous insoluble film resulting from treatment with an alginate reaction-product formed by gelling a purified metal alginate in the cold, the gelled alginate also carrying incorporated therein a fortifying agent.;* and that the said Letters Patent should be read with this correction therein that the same may conform to the record of the case in the Patent Office.

Signed and sealed this 30th day of October, A. D., 1923.

[SEAL.]

KARL FENNING,
*Acting Commissioner of Patents.*